United States Patent [19]

Heesch et al.

[11] Patent Number: 4,488,754
[45] Date of Patent: Dec. 18, 1984

[54] SEAT BELT ANCHORING APPARATUS

[75] Inventors: Max O. Heesch, Brooklyn; Harold G. Scholin, Jackson, both of Mich.

[73] Assignee: International Telephone and Telegraph Corporation, New York, N.Y.

[21] Appl. No.: 394,680

[22] Filed: Jul. 2, 1982

[51] Int. Cl.³ .............................................. B60R 21/10
[52] U.S. Cl. .................................. 297/216; 297/473; 188/188; 280/805
[58] Field of Search ............... 297/216, 379, 468, 473; 188/65.1, 188; 280/805, 806

[56] References Cited

U.S. PATENT DOCUMENTS

| | | | |
|---|---|---|---|
| 496,958 | 5/1893 | Scheid | 188/65.1 |
| 564,012 | 7/1896 | Fraser | 188/65.1 |
| 1,368,650 | 2/1921 | Ortman | 188/65.1 X |
| 2,662,734 | 12/1953 | Allenbaugh | 188/188 |
| 3,186,760 | 6/1965 | Lohr et al. | 297/216 |
| 3,834,496 | 9/1974 | Takada | 188/188 X |
| 3,897,101 | 7/1975 | Hess | 297/216 X |
| 3,972,561 | 8/1976 | Breitschwerdt | 297/216 |
| 4,225,184 | 9/1980 | Strowick | 297/468 |
| 4,229,041 | 10/1980 | Werner | 297/468 |
| 4,248,480 | 2/1981 | Koucky et al. | 297/216 X |

FOREIGN PATENT DOCUMENTS

| | | | |
|---|---|---|---|
| 2803896 | 8/1979 | Fed. Rep. of Germany | 297/473 |
| 2084002 | 4/1982 | United Kingdom | 297/468 |

Primary Examiner—William E. Lyddane
Assistant Examiner—Peter R. Brown
Attorney, Agent, or Firm—James B. Raden; Edward J. Brosius

[57] ABSTRACT

Apparatus for securing a seat belt to a longitudinally adjustable seat track mechanism of a motor vehicle. The seat belt is connected to one end of a lever, the lever being pivotal within the legs of a stepped U bracket, the step being secured to the movable track of the mechanism. The lever has a clamp end normally held out of engagement with a longitudinally extending tension member such as a wire cable secured to the vehicle body. The lever is held in its normal condition by either a shear pin or by the action of a helical spring. When a crash load is applied to the seat belt, the load causes the pin to shear (or when a spring is used—overcomes the spring bias) and the lever freed of restraint rotates to a position clamping the tension member against the base of the U bracket and preventing movement of the seat and seat belt relative to the vehicle body.

10 Claims, 5 Drawing Figures

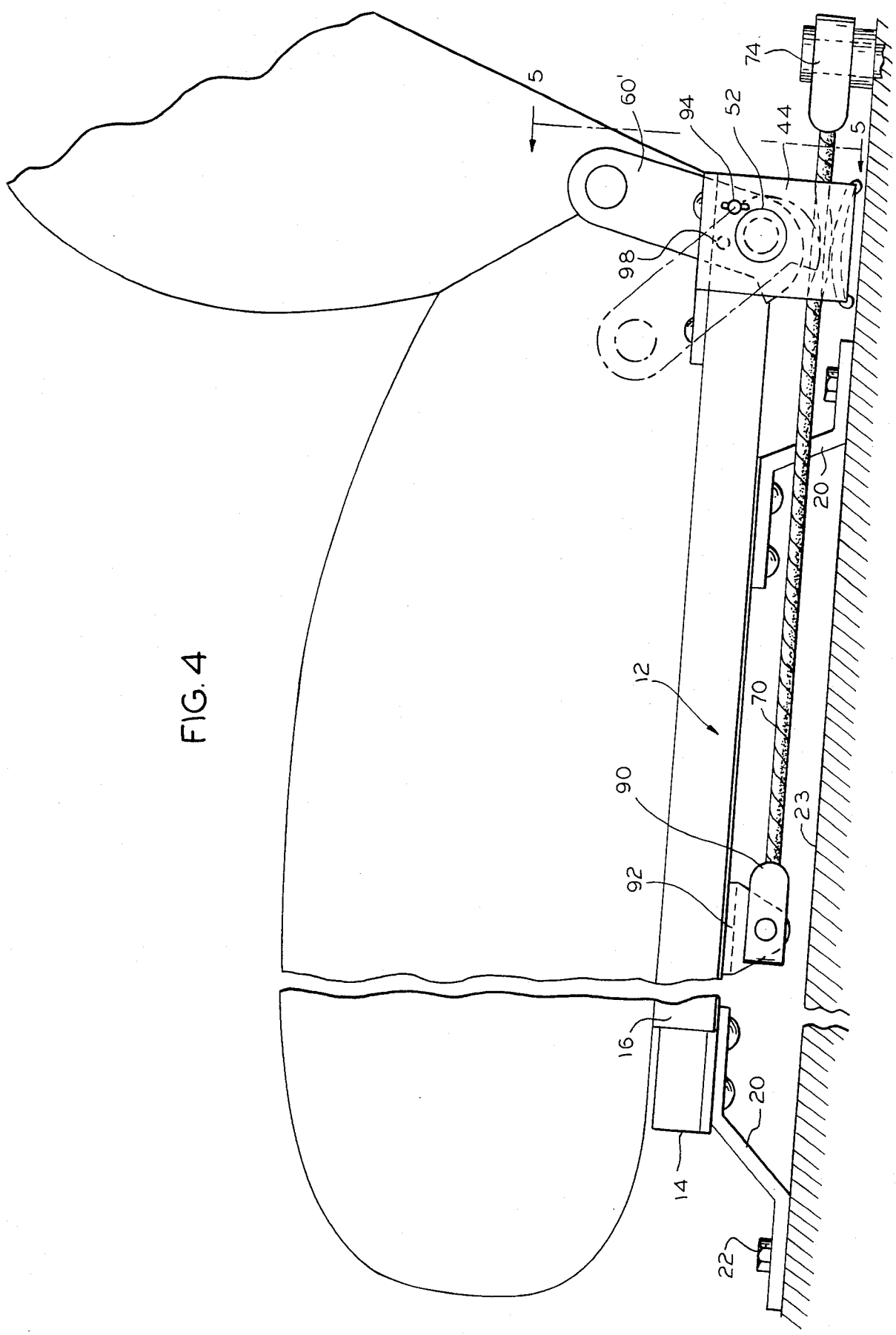

SEAT BELT ANCHORING APPARATUS

BACKGROUND OF THE INVENTION

Seat belts for a motor vehicle are generally directly anchored to the floor or window pillars of the vehicle body to produce the requisite strength to resist collision forces.

Where seat track mechanisms are employed to provide horizontal and/or vertical adjustment for the seat, the seat belts are still anchored directly to the vehicle body since the adjustment mechanism is not engineered to withstand collision or crash loading forces which include the weight of the seat occupant.

Patents have issued showing apparatus for anchoring seat belts to the seat tracks, for example, U.S. Pat. Nos. 3,186,760 to T. Lohr et al issued June 1, 1965; 4,225,184 to Strowick issued Sept. 30, 1980; 4,229,041 issued Oct. 21, 1980 to P. Werner and 4,260,178 issued Apr. 7, 1981. These structures generally function to force a seat member into engagement with the vehicle floor on the application of crash level forces on the seat belt.

Also known are devices such as U.S. Pat. No. 4,281,871 issued Aug. 4, 1981 to Grittner et al which respond to crash loading conditions to lock the sections of the track together and prevent track movement.

Also known are seat belt locating mechanisms such as U.S. Pat. No. 3,424,494 issued Jan. 28, 1969 to McIntyre et al, i.e. which the seat belt is depressed to release the engagement of a pin in recess between the belt and seat track mount. The belt may be moved to a desired location in which the engagement is restored.

SUMMARY OF THE INVENTION

The present invention is directed to apparatus which allows the seat belt mount to move with the vehicle seat track mechanism on normal adjustment of the seat track mechanism and acts to clamp the seat belt mount to the vehicle body in case of a crash. The present solution to this known problem is accomplished with but little added weight. The present invention meets the crash loading specifications of five to six thousand pounds of force applied to the seat belt without separating the seat structure from the vehicle.

The present invention is equally applicable to seat track mechanisms of the manual type and to those of the powered or motor driven type. In either type of adjustment mechanism there is a lower track which is secured to the vehicle body or floor. The upper track is slidable along the lower track and is held in a position once adjusted to that position. In the manual type, the relative position in generally held by a tooth in socket engagement while in the powered type, the engagement is held within the driving members such as a screw in a nut. The adjustment holding is generally sufficient to retain the seat in place under normal conditions and to retain the seat and track alone under crash conditions. When the weight of a passenger is added to that of the seat and track, whether manual or power driven, the seat adjusting mechanism is not of sufficient strength to retain the hold engagement under collision or crash loads.

In the present invention, the seat belt is mounted pivotally to the upper seat track for fore and aft movement with the seat. During normal conditions, adjustment of the seat track is unencumbered by the normally disengaged clamp apparatus.

The clamp apparatus includes the pivotal lever commonly mounted with a clamp receiver on the upper seat track. A wire cable is affixed to the vehicle floor or to the lower track, forward and aft of the lever. The cable preferably is held reasonably taut between its cable mounts. The cable receiver or clamp bracket straddles the wire cable and is secured to the upper track by the mount for the lever. The free end of the lever serves as the end mount for the seat belt. The seat belt mount lever or clamp lever is held in its disengaged condition by a hold means. The hold means may be a spring or may be a shear pin normally obstructing rotation of the lever. In either event, at rotational forces above a predetermined amount, the spring releases the lever for movement or the pin shears to allow the lever to rotate to an anchor position clamping the cable against the cable receiver clamp to prevent relative motion between the upper track of the mechanism and the lower track and vehicle body or floor.

Preferably, the present apparatus is most applicable to split type seats in which there is a track at each side of the belt area for a user such that either one or preferably both belt ends can be secured in the manner shown for the one side herein. For bench type seats, central slave tracks could be positioned intermediate the seat width to anchor the inboard ends of the seat belts.

With the invention as shown, the clamping cam is released for rotation at a nominal value of seat belt pull such as 400 lbs. As the seat belt pull increases, the cam begins to rotate and clamp against the cable. At values of belt pull up to approximately 1500 lbs, the seat track absorbs the force of the pull. By this time, the cam lever has rotated through an angular extent sufficient to clamp the cable frictionally. For values of pull beyond the 1500 pounds, the clamp action of cam to cable will lock the seat belt to the floor anchor. In this way, a static frictional gripping force from cam to cable is generated to enable the seat belt to withstand a pull force of up to 6000 pounds.

BRIEF DESCRIPTION OF THE DRAWINGS

FIG. 4 is a side view in elevation of a seat employing a second embodiment of our invention.

DETAILED DESCRIPTION

Figure 1:
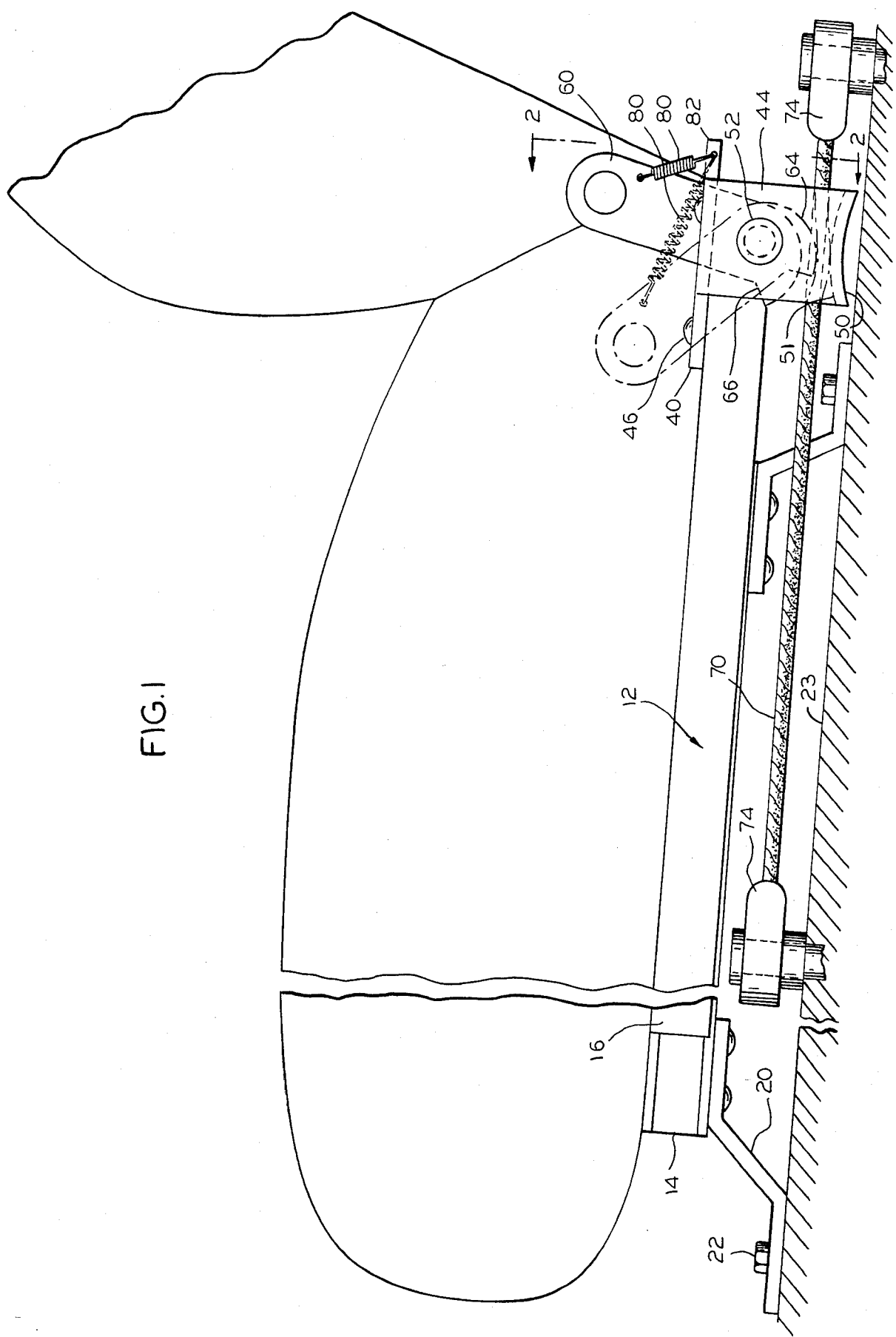
FIG. 1 is a side view in elevation of a motor vehicle seat employing our invention.
Figures 2, 5:
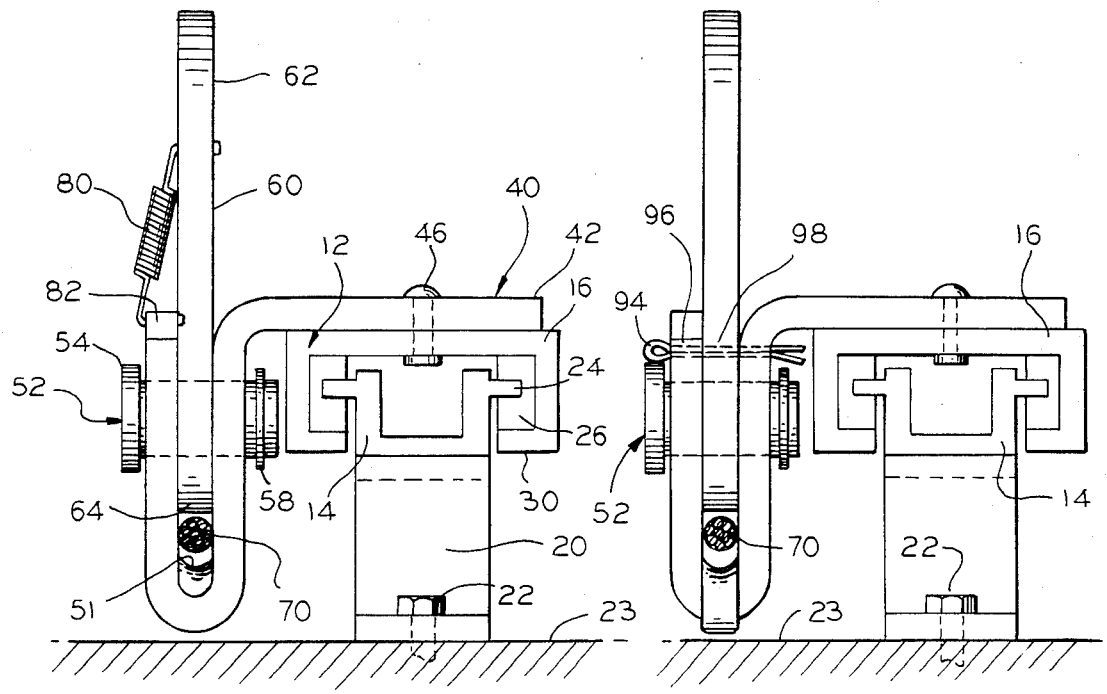
FIG. 2 is a sectional view taken along line 2—2 of FIG. 1.
FIG. 5 is a sectional view taken along the line 5—5 of FIG. 4.

In FIG. 1, we show a seat track mechanism 12 which may be a manual seat track or may be a seat track whose adjustment is power driven. Specifically shown is the structure of a power driven track such as that of U.S. Pat. No. 4,015,812 issued Apr. 5, 1977 to M. O. Heesch. The structure shown forms one side of the full seat track mechanism, the other side of the mechanism being the mirror image of that shown. The track mechanism 12 as is conventional is comprised of a stationary lower track 14 in which there is mounted an upper slidable track 16. The lower track 14 is secured by rivets or the like to mounting brackets 20 both at front and rear. By any conventional means such as bolts 22, the brackets 20 may be fixed to the vehicle floor 23. The lower track is U shaped with outwardly extending flanges 24 (FIG. 2)

to which are affixed conventional sliding blocks 26 of nylon or the like. The upper track comprises a downwardly open channel with inwardly directed lower flanges 30 straddling blocks 26 within the flanges to enable translatory sliding motion of the respective upper tracks on the stationary lower tracks.

Track mechanisms are provided at each lateral side of the seat, the track mechanism being elongated longitudinally as is conventional.

At the rear of the upper track, a U shaped steel clamp bracket 40 with a mounting cross bar 42 stepped from the body 44 of the bracket U is fastened securely to the upper track by suitable fastening means such as spaced rivets 46. The riveting provides a connection which will withstand heavy shock loading forces. The U body of bracket 40 extends alongside the lower track and is parallel to the track as seen best in FIGS. 2 and 3. The base of the U body is convex with a crowned section or arcuate crest 50 at the longitudinal center of the body with the base curved downwardly at the longitudinal ends 51 (as seen best in FIG. 1).

The parallel legs of the clamp bracket body have aligned circular bearing openings in which pivot rod 52 is mounted. The rod 52 has an enlarged head 54 outside one leg 50 of the body 44 from which a rod mid-section protrudes through the legs of the U body to its free end adjacent the upper track. As shown, a retainer such as C-shaped snap ring 58 is fitted in a suitable groove adjacent the end of the rod acts to hold the rod in place on the bracket 40. In another form, a cotter pin (not shown) may be inserted through a suitable opening in the rod.

A lever 60 is mounted on the pivot rod, the lever being rotatable in the space between the legs of the U body 44. The upper end 62 of the lever 60 serves as mount for the seat belt (not shown). The lower end of the lever 60 is configured with an arcuate cam face 64 of gradually increasing diameter (see FIG. 1) in the forward direction terminating in a ramp 66. The cam face is spaced a distance from the crowned section 50 of bracket 40 at any angular orientation of the cam face 64. The portion of the face 62 adjacent ramp 66 of course, would be the closest to the crown with the cam face in a position shown in dashed lines in FIG. 1.

Extending through the U body of the bracket adjacent the crowned section is a wire rope or cable 70. The cable extends longitudinally parallel to the seat track at a height just above the crowned section. The cable 70 preferably may be steel aircraft cable of a type known for superior strength in tension and shear, and having a nominal outer diameter of one fourth inch. Such a cable has a minimum break strength of 5900 pounds. At each longitudinal end, the cable is gripped by means of a conventional swage fitting 74, over the cable, the swage fitting having an eye for securement to the vehicle floor in a structural solid manner. The cable extends substantially taut alongside the track mechanism for a distance greater than the maximum travel of the track mechanism, which may range from five to nine inches, the cable allowing the full travel of the track without bracket 40 striking either of the cable end fittings 74. We have found that a cable having an outer diameter of from 7/32" to 5/16" may be used satisfactorily. Cable has been found to be preferable over a metal rod, rigid metal block, bean or bar due to other considerations such as ease of mounting and alignment. Since, however, tensile strength of the cable or rod is the major property necessary, a bar, rod or beam could be used.

Aesthetically, the front anchor of the cable may be hidden beneath the floor carpet with the cable resting in a carpet slit.

In the present apparatus, as the seat is adjusted longitudinally, the seat belt terminating lever 60 moves with the seat. Thus, no resetting of the belt becomes necessary when the seat is adjusted after the belt has been tightened on the body of the seat occupant.

The lever and seat belt are held in the position shown in full lines in FIG. 1 by a spring such as the tension spring 80 which is secured suitably to a rearward extension 82 of the horizontal mounting section of the U clamp bracket. The spring resists forces on the belt tending to move the lever. With the lever in the solid line position, the cam face 64 is free of engagement with the cable 70 and the cable is spaced free of the crown 50 of the U clamp body 44. Movement of the seat track is unimpeded by the anchoring apparatus shown. We have found that a 0.060" clearance between lever and cable and cable and clamp bracket allows unimpeded movement. Spring 80 will elongate when a predetermined pulling force is applied to the lever 60 by the belt, a force of more than the 400 pounds being required to move the lever from the solid line position of FIG. 1.

When a force of collision magnitude is applied to the seat belt with an occupant in the seat, the spring 80 yields and the lever 60 pivots toward the horizontal and toward the position shown in dashed lines in FIG. 1. As the lever rotates, the cam face applies an increasing clamping force on the cable 70 to clamp the cable against the crown 50 of the U body 44 and thereby clamping the upper track 16 bearing the lever and U body to the stationary fixed cable 70. At the values of applied pulling force up to approximately 1500 lbs, the seat track mechanism is designed to withstand the pull force. By this time, the cam lever will have rotated into a gripping relation on the cable eliminating any sliding action between clamp and cable. When the lever has rotated approximately 20° from the normal position, the clamping action is fully in force deforming the cable. With the full clamp action in force, the clamp bracket tends to deflect in a counter clockwise direction (as viewed in FIG. 2) about its mounting at rivets to bind the clamp bracket and lever to the cable. In this way the upper track and seat borne thereby are firmly anchored to the vehicle floor and structure during the collision condition. The anchoring becomes independent of the latching or mating of the upper track to the lower track after sufficient rotation of the cam to generate the static frictional gripping force between lever, bracket and cable. The arcuate crown prevents the cable from being sheared by the lever compressing the cable against the clamp bracket.

As shown in FIG. 1, the increase in radius of the lever cam face 64 in the direction of rotation of the lever provides an excursion equal to almost the full diameter of the cable 70. The force applied on the lever when plotted provides a curve indicative of greater force per cam excursion than a straight line function. At cam rotation values of less than 20°, the friction between cam and cable is essentially a straight line function due to sliding friction. In this range, the seat position is held by the seat track latch action. At greater pull values on the seat belt, the amount of rotation of the cam lessens. The clamping action is generated by the static friction between cam, cable and clamp bracket.

Figure 3:
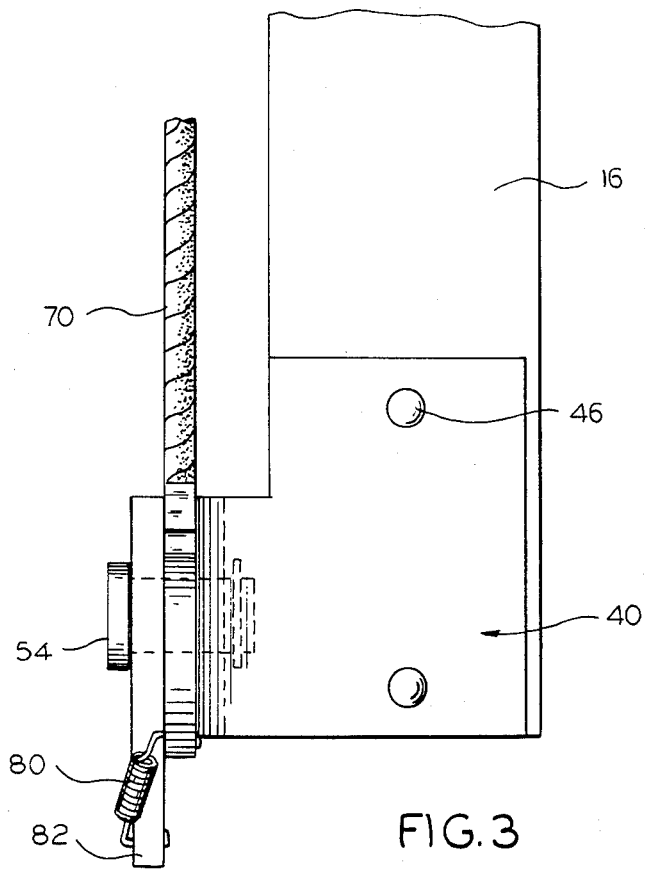
FIG. 3 is a plan view of the side of the seat shown by FIG. 2.

The embodiment of FIGS. 4 and 5 differs from that of FIGS. 1-3 in a number of areas; i.e. the forward mounting of the cable, the means for maintaining the lever in the normal position (spring 80 in FIGS. 1–3) and the use of an insert to provide the crown in the clamp bracket.

In FIG. 4, the front end of the cable 70 is held within a suitable cable end swage fitting 90, the fitting being held by an L shaped bracket 92 affixed to the underside of the lower track 14 by suitable rivets. In the normal vehicle front compartment configuration, the mounting of the cable fitting to the floor may be difficult to perform. Thus, mounting of the cable front end to the stationary lower track as shown by FIGS. 4 and 5, should be easier to implement. The lower seat track 14 is fixed to the vehicle floor 23 so the net effect is the same as that for the mounting of FIGS. 1–3 in strength.

A second point of difference in the embodiment of FIGS. 4 and 5 is the replacement of the spring 80 with a shear pin 94. The shear pin which may be a cotter pin, as shown, extends through the aligned opening 96 legs of the clamp bracket and through an aligned opening 98 in the lever arm.

Alternatively (not shown) the shear pin may be external to and abut the edge of the lever 60' without the need for an opening in the lever. A suitable backstop would also be provided to position the lever, the backstop preferably being a bent over tab on the clamp bracket.

In either case, at forces above 400 pounds applied to the lever 60' in the direction tending to rotate the lever toward the clamp position of the dashed lines, the lever will cause the pin 94 to shear and allow the lever 60' to pivot toward the clamping positions. The value of shear force has been chosen as one sufficiently high to prevent clamp action and interference with seat track movement under the normal operating conditions of the vehicle. The pin 94 will shear as the forces increase above the normal toward the collision forces. The specification mandated by the Federal government require that the seat belt withstand forces of up to 6000#, and clamping mechanisms of the type shown in either embodiment herein have been found to meet those requirements.

The final point of difference in the embodiment of FIGS. 4 and 5 is the use of a crown insert 50' within the clamp bracket. The insert is an arcuate convex headed member symmetrical relative to the vertical plane through the pivot pin of FIG. 4. The crown insert 50' has overhang members 95 crimped or snap fitted about the edges of the clamp bracket to hold it firmly in place.

Naturally, using the shear pin approach of FIGS. 4–5, the pin 94 must be replaced once it has been sheared. For this reason, the shear value of the pin must be sufficiently high to prevent shearing of the pin under sharp braking condition and other normally encountered conditions. The pin will however, shear sufficiently below the actual crash loading to enable the clamp action without impediment.

The value of pull at which the spring of FIGS. 1–3 and the shear pin of FIGS. 4–5 allow appreciable movement of the cam lever has been chosen as approximately 400 pounds. This value was selected as the wieght of a two hundred pound person being moved with a force of 2g's. This restraint can be set at any desired level by the selection of spring or shear pin characteristics. The level selected in one which will not allow cam movement during normal driving and braking conditions even with minor panic stops including collisions up to 5 m.p.h.

The resistance of the seat track mechanism to crash loads is one which is required by federal standards. The track mechanism whether manual or powered must withstand forces of up to 1500 pounds—collision force without seat occupant. When the weight of a seat occupant is added, the forces are above those required of the seat track mechanism itself. Such mechanisms are, of course, common in the automotive industry andare shown by numerous patents.

In tests, it has been found that the cam began to compress the wire cable at 14° and at this point began its braking effect. The cam continued its rotation in response to little increase in applied pull force until 28° of travel. The curve of cam rotation to pull force becomes almost linear at elevated pull forces with sharp slope. In tests, it was found that the position the seat in the track, i.e. at the forward end, intermediate or rear end has little effect on the clamping response to an applied pulling force.

By the construction shown, there is provided a seat belt anchor using static frictional braking, and during the period in which the sliding friction is being generated, the secondary restraining force of the track mechanism is employed. During a crash, the applied force is sufficiently great to cause the pivotal clamping cam to compress the cable against the clamp receiver with a static friction force during the period when the seat track mechanism restraint is active. Thereafter, the clamping action of the present invention anchors the seat belt and seat track to the vehicle body for pulling force values well above the required levels.

What is claimed is:

1. A seat belt anchoring apparatus for a motor vehicle, in which the seat is mounted for fore and aft adjustment through the use of a seat track mechanism including a stationary lower seat track affixed to the floor of the vehicle and an upper track bearing the seat slidably relative to the lower track, a seat belt holder comprising a pivotal lever, a bracket pivotally securing the lever to the upper seat track for movement therewith, means normally maintaining said lever in a first position a cam face mounted on said lever for progressive excursion on pivotal movement of the lever, a cable, means affixing said cable to the vehicle floor and spaced therefrom adjacent to and out of physical contact with the cam face when the lever is in its first position, the cable having a generally taut condition generally spaced from the cam face a like distance regardless of the position of the cam face along the cable, said bracket including a clamp receiver secured to said upper seat track and positioned adjacent said cable on the side of the cable opposite said cam face, said lever pivotally movable out of said first position to a clamp position in response to a crash level force acting on said seat belt, the cam face advanced by the pivotal movement of said lever to engage said cable in clamp position to jam said cable against said clamp receiver and anchor said seat against fore and aft movement relative to the vehicle floor.

2. Apparatus as claimed in claim 1, in which said bracket comprises a U shaped bracket having opposed spaced legs, a pivot rod extending between said legs for pivotally supporting said lever, and the joinder of the legs of bracket forming the clamp receiver.

3. Apparatus as claimed in claim 1, in which there is means for holding said lever in the first position, said holding means comprising a pin extending between the legs of the U bracket, said pin responsive to forces applied thereto by said lever in response to less than crash level force but above a predetermined force to shear and allow said lever to pivot from said first position.

4. Apparatus as claimed in claim 1, in which said cam face comprises an arcuate face of progressively greater radius at the end of the lever remote from a connection to a seat belt.

5. An anchoring apparatus for the seat belt of a motor vehicle in which the vehicle seat is adjustable in a fore and aft direction relative to the structure of the vehicle through a seat track mechanism in which the mechanism has a lower stationary track affixed to the vehicle structure and an upper track slidable along the lower track, the apparatus comprising a stepped bracket affixed to the outboard side of the upper seat track adjacent the step of the bracket, said bracket having a U shaped body spaced from the step, a wire rope passing between the legs of the U adjacent and within the base of U body, beams securing said wire rope to the vehicle structure outwardly of the limits of fore and aft movement of said mechanism to hold the body of the wire rope tautly, a lever pivotally mounted between the legs of the U body, a seat belt secured to the lever at one end, an arcuate cam face at the opposite end of the lever across the pivotal mounting, means holding said lever to position said cam face spaced a common distance from said wire rope in a normal position with said seat in any fore and aft position, said lever pivotally movable in response to forces above a predetermined level applied to said seat belt for overcoming said holding means and for rotating said cam face into a clamp engagement of the rope against base of the U body to clamp the seat belt and lever relative to the vehicle structure.

6. An apparatus as claimed in claim 5, in which the wire rope extends longitudinally parallel to the mechanism and in which there is a wire rope mounting secured to the structure of the vehicle spaced rearward of said U body and a mounting secured to the lower seat track spaced forward of the U body for holding said rope taut within said bracket body.

7. An apparatus as claimed in claim 5, in which said lever holding means comprises an extensible spring normally maintaining said lever in said normal position and extensible in response to said forces above said predetermined level to extend and allow rotation of cam face.

8. An apparatus as claimed in claim 5, in which said holding means comprises a shear pin mounted between the legs of the U body to prevent rotation of the lever with the cam face in the normal position.

9. An apparatus as claimed in claim 5, in which the wire rope extends longitudinally parallel to the mechanism and in which there are wire rope mountings secured to the vehicle floor forward and rearward of the U body, said mountings holding the rope taut within said body.

10. A seat belt anchoring apparatus for a vehicle which includes a horizontal adjustable seat track mechanism having a lower stationary track affixed firmly to the vehicle structure and an upper track mounted on said lower track for slidable movement, said upper track adapted to support a seat thereon for adjustable movement, and in which the mounting of said upper track to said lower track resists crash loading forces without an occupant in said seat, wherein there is a seat belt for restraining an occupant of said seat from forward movement at loading forces up to and through collision lever forces, the invention comprising: a lever for securing one end of a seat belt, a rod pivotally mounting said lever relative to said upper track for movement therewith, means retaining said lever in a normal position, a clamping actuator at one end of said lever responsive to pivotal movement of said lever of assuming a first position with said lever in its normal position, a cable member secured to the body of said vehicle and extending in the direction of adjustment of said seat track mechanism, means affixing said cable member to said structure forward and aft of the travel limits of the upper track to hold said cable member in a taut condition, said cable adjacent and spaced from the clamping actuator with the actuator in said first position, a clamp receiver affixed to the upper seat track enclosing the cable, nominally spaced from the cable, and in which said retaining means releases said lever for pivotal movement from its normal position on the application of a pulling force on the seat belt above a first predetermined amount, an arcuately curved face of said actuator progressively increasing clamping force directed against said cable during pivotal movement of the lever from its normal position to progressively clamp said cable against said clamp receiver, and in which the seat track mechanism imposes resistance to crash loading to maintain said seat belt during the beginning of a period of increasing clamping force by said actuator face and above said first amount of pulling force, and said actuator face compressing and deforming said cable against said receiver in response to continued force above said first predetermined amount applied to said seat belt to anchor said seat and upper seat track to said vehicle body through the cable.

* * * * *